US011623379B2

(12) United States Patent
Nagami et al.

(10) Patent No.: US 11,623,379 B2
(45) Date of Patent: Apr. 11, 2023

(54) CLAMPING DEVICE, MOLDING APPARATUS, AND MOLDING METHOD

(71) Applicant: Toshiba Kikai Kabushiki Kaisha, Tokyo-to (JP)

(72) Inventors: Takeshi Nagami, Numazu (JP); Hiroyuki Onuma, Numazu (JP)

(73) Assignee: SHIBAURA MACHINE CO., LTD., Tokyo (JP)

( * ) Notice: Subject to any disclaimer, the term of this patent is extended or adjusted under 35 U.S.C. 154(b) by 0 days.

(21) Appl. No.: 15/539,805

(22) PCT Filed: Oct. 1, 2015

(86) PCT No.: PCT/JP2015/077922
§ 371 (c)(1),
(2) Date: Jun. 26, 2017

(87) PCT Pub. No.: WO2016/103830
PCT Pub. Date: Jun. 30, 2016

(65) Prior Publication Data
US 2017/0348888 A1   Dec. 7, 2017

(30) Foreign Application Priority Data

Dec. 26, 2014   (JP) ............................. JP2014-265693

(51) Int. Cl.
*B29C 45/80*   (2006.01)
*B29C 45/66*   (2006.01)
(Continued)

(52) U.S. Cl.
CPC .............. *B29C 45/80* (2013.01); *B22D 17/26* (2013.01); *B29C 45/66* (2013.01); *B29C 45/661* (2013.01);
(Continued)

(58) Field of Classification Search
CPC ....... B29C 45/80; B29C 45/661; B29C 45/66; B29C 2945/76568; B29C 2945/76083;
(Continued)

(56) References Cited

U.S. PATENT DOCUMENTS 4,025,264 A * 5/1977 Hehl ....................... B29C 45/17
425/190
5,059,365 A * 10/1991 Hertzer ............... B29C 45/1751
264/40.5

(Continued)

FOREIGN PATENT DOCUMENTS

CN         1873639 A    * 12/2006
JP       H0486211 A    *  3/1992
(Continued)

OTHER PUBLICATIONS

International Search Report (with English Translation) issued in PCT/JP2015/077922 dated Nov. 24, 2015.
(Continued)

*Primary Examiner* — Michael N Orlando
*Assistant Examiner* — Christopher W Raimund
(74) *Attorney, Agent, or Firm* — DLA Piper LLP US (57) ABSTRACT

A clamping device (14) comprises a pressure receiving platen (24), a stationary platen (20), a movable platen (22), a toggle mechanism (28), and a drive device (37). A first position detector (38a) detects the operation amount of the movable platen (22) based on the position of a crosshead (26); a pressure detector (35) detects the actual clamping force of a mold (19); and a second position detector (43) detects the actual position of the movable platen (22). A control portion (50) has first correction means correcting the operation amount of the movable platen (22) at the time of a minute mold opening operation based on the actual clamping force and on the set clamping force, and second correc- (Continued)

tion means correcting the operation amount of the movable platen (22) at the time of the minute mold opening operation based on the operation amount of the movable platen (22) and on the position of the movable platen (22).

5 Claims, 3 Drawing Sheets

(51) Int. Cl.
   *B22D 17/26* (2006.01)
   *B29K 105/04* (2006.01)

(52) U.S. Cl.
   CPC ............... *B29C 2945/76013* (2013.01); *B29C 2945/76083* (2013.01); *B29C 2945/76568* (2013.01); *B29K 2105/04* (2013.01)

(58) Field of Classification Search
   CPC .. B29C 2945/6013; B29C 2945/76013; B22D 17/26; B29K 2105/04
   See application file for complete search history.

(56) References Cited

U.S. PATENT DOCUMENTS

| | | | | |
|---|---|---|---|---|
| 8,512,608 | B2* | 8/2013 | Koike | B29C 45/561 |
| | | | | 264/328.7 |
| 2001/0026028 | A1* | 10/2001 | Nakamoto | B29C 45/7653 |
| | | | | 264/40.5 |
| 2007/0057392 | A1* | 3/2007 | Yoshida | B29C 45/762 |
| | | | | 264/40.1 |
| 2007/0224308 | A1* | 9/2007 | Nishimura | B29C 45/1744 |
| | | | | 425/451.9 |
| 2011/0285046 | A1 | 5/2011 | Koike et al. | |
| 2016/0023391 | A1* | 1/2016 | Nishizawa | B29C 45/1744 |
| | | | | 425/575 |

FOREIGN PATENT DOCUMENTS

| | | |
|---|---|---|
| JP | 2005-254607 | 9/2005 |
| JP | 2008-110498 | 5/2008 |
| JP | 2008-143061 | 6/2008 |
| JP | 4787894 B2 | 10/2011 |
| JP | 2011-240603 | 12/2011 |
| JP | 5031867 B2 | 9/2012 |

OTHER PUBLICATIONS

Written Opinion issued in PCT/JP2015/077922 dated Nov. 24, 2015.
International Preliminary Report on Patentability (with English Translation of Written Opinion) issued in PCT/JP2015/077922 dated Jun. 27, 2017.
English Language Abstract of JP 2005-254607 published Sep. 22, 2005.
English Language Abstract of JP 2008-143061 published Jun. 26, 2005.
English Language Abstract of JP 2011-240603 published Dec. 1, 2005.
Office Action in German Patent Application No. 112015005780.3 dated Apr. 2, 2019.
Office Action in Indian Patent Application No. 201717020599, dated Sep. 23, 2019.

* cited by examiner

CLAMPING DEVICE, MOLDING APPARATUS, AND MOLDING METHOD

CROSS REFERENCE TO RELATED APPLICATIONS

This application is a U.S. National Stage Application of International Application No. PCT/JP2015/077922 filed Oct. 1, 2015, which claims priority from Japanese Patent Application No. 2014-265693 filed Dec. 26, 2014. The entirety of all the above-listed applications are incorporated herein by reference.

TECHNICAL FIELD

The present invention relates to a clamping device, a molding apparatus, and a molding method.

BACKGROUND ART

Conventionally, as one of the molding methods using an injection molding machine, there has been widely adopted injection foam molding, in which a resin is foamed into a molding. A foam molding prepared by this injection foam molding is of lightweight and allows addition of various characteristics such as heat insulating properties and sound absorbing qualities.

In injection foam molding, the mold undergoes thermal expansion due to fluctuations in the mold temperature, resulting in generation of a difference between the actual clamping force and the set clamping force. In a known technique, the movement amount by which the movable platen moves at the time of a core-back operation is corrected based on this difference between the actual clamping force and the set clamping force (See, for example, Patent Document 1).

Further, in connection with injection foam molding, a technique is known in which there are provided a movable platen position detecting portion and a crosshead position detecting portion and in which, at the time of the core-back operation, the position of the crosshead is controlled based on position data of the movable platen position detecting portion obtained through previous operation so that no error corresponding to the gap of a link pin may be generated (See, for example, Patent Document 2).

Thus, through a combination of Patent Documents 1 and 2, it might be possible, at the time of the core-back operation, to prevent generation of an error in mold opening amount due to the gap of the link pin, and to prevent generation or an error in mold opening amount as a result of expansion of the mold due to fluctuations in the mold temperature.

PRIOR ART DOCUMENTS

Patent Documents

Patent Document 1: JP-A-2011-240603
Patent Document 2: JP-A-2005-254607

SUMMARY OF THE INVENTION

In the technique consisting of a combination, of Patent Documents 1 and 2, however, no examination is made on machining errors of the movable platen, the pressure receiving platen (link housing), the link, the link pin, etc., and the error in the mold opening amount due to the machining error of each component is not taken into consideration. Thus, the technique has a problem in that an error in the mold opening amount is generated or is not generated at the time of the core-back operation depending on the machine body of the opening/closing device (damping device).

The present invention has been made in view of the above problem. It is an object of the present invention to provide a clamping device, a molding apparatus, and a molding method capable of preventing the problem of possible generation of an error in the mold opening amount of the damping device for each machine body at the time of the core-back operation due to the presence of a machining error in the components of the damping device.

DISCLOSURE OF THE INVENTION

According to the present invention there is provided a damping device including: a pressure receiving platen; a stationary platen on which one die of a mold is mounted; a movable platen which is arranged opposite the stationary platen and on which other die of the mold is mounted; a toggle mechanism, one end of which being connected to the pressure receiving platen and the other being connected to the movable platen, the toggle mechanism opening and closing the mold by causing the movable platen to advance and retreat; a drive device including a crosshead and driving the toggle mechanism; a first position detector detecting an operation amount of the movable platen based on a position of the crosshead; a pressure detector detecting an actual clamping force of the mold; a second position detector detecting an actual position of the movable platen; and a control portion controlling at least the drive device. In the clamping device, the control portion has first correction means correcting the operation amount of the movable platen during a minute mold opening operation based on the actual clamping force detected by the pressure detector and on a set clamping force previously set by the control portion, and second correction means correcting the operation amount of the movable platen during the minute mold opening operation based on the operation amount of the movable platen obtained by the first position detector and on the position of the movable platen obtained by the second position detector.

In the clamping device of the present invention, a correction amount obtained by the second correction means may be a value that varies according to a movement distance the movable platen moves at a time of the minute mold opening operation.

Further, according to the present invention, there is provided a molding apparatus comprising the clamping device.

Further, according to the present invention, there is provided a molding method including: a minute mold opening step in which a minute mold opening operation is performed by using the damping device, such that the movable platen moves in a direction away from the stationary platen. The minute mold opening step executes a first correction in which an operation amount of the movable platen is corrected based on the actual clamping force detected by the pressure detector and on a set clamping force previously set by the control portion, and a second correction in which the operation amount of the movable platen is corrected based on the operation amount of the movable platen obtained by the first position detector and on a position of the movable platen obtained by the second position detector.

According to the present invention, even in the case there exists an individual difference between the clamping devices due to the presence of a machining error in the components of each clamping device, it is possible to eliminate the influence of the individual difference due to the machining error at the time of the core-back operation.

MODES FOR CARRYING OUT THE INVENTION

Figure 1:
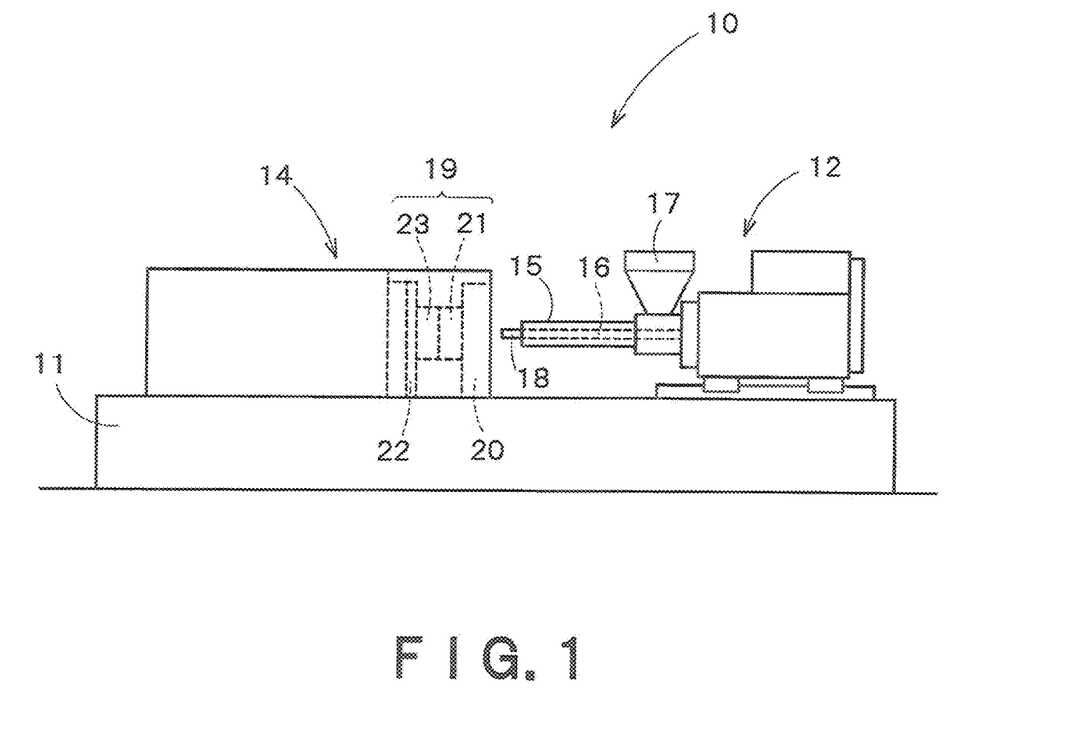
FIG. 1 is a side view schematically illustrating an injection molding machine to which a toggle type clamping device according to the present invention is applied.

In the following, a toggle type damping device of an injection molding machine according to an embodiment of the present it will be described with reference to the drawings. FIG. 1 is a diagram schematically illustrating the construction of an injection molding machine (molding apparatus) 10 to which a toggle type damping device according to an embodiment of the present invention is applied. In FIG. 1, reference numeral 12 indicates the entire injection device of the injection molding machine. Reference numeral 14 indicates a toggle type clamping device (clamping device, mold opening/closing device, opening/closing device) of the injection molding machine.

In FIG. 1, a screw 16 is inserted into a barrel 15 of the injection device 12 so as to be rotatable and movable in the axial direction. A resin (molding material, material) is charged into the barrel 15 from a hopper 17. Around the barrel 15, there is arranged a heater (not shown) heating the barrel 15. In the injection device 12, the screw 16 is rotated by a measurement motor (not shown), and measurement is performed by accumulating the resin in the front portion of the barrel 15 while melting and kneading the resin. The resin accumulated in the front portion of the barrel 15 is charged from a nozzle 18 into a cavity formed by a stationary die 21 and a movable die 23 by causing the screw 16 to advance by an injection motor, a ball screw, and a nut (which are not shown).

Next, the toggle type damping device 14 will be described with reference to FIG. 2. The toggle type clamping device 14 comprises, for example, a stationary die plate (stationary platen) 20 fixed to a frame 11, a rear plate (pressure receiving platen, link housing) 24 installed on the frame 11, and a movable die plate (movable platen) 22 arranged opposite the stationary die plate 20 and capable of moving toward or away from the stationary die plate (stationary platen) 20.

A stationary die (one die of the mold, the other die of the mold) 21 is mounted on the stationary die plate 20, and a movable die (the other die of the mold, one die of the mold) 23 is mounted on the movable die plate 22 so as to face the stationary die 21.

The stationary die plate 20 and the rear plate 24 are connected to each other via a plurality of (e.g., four) tie bars 36. When a mold 19 is clamped up (when clamping is performed), the tie bars 36 receive a clamping force generated by a toggle mechanism (opening/closing mechanism, mold opening/closing mechanism clamping mechanism) 28.

Figure 2:
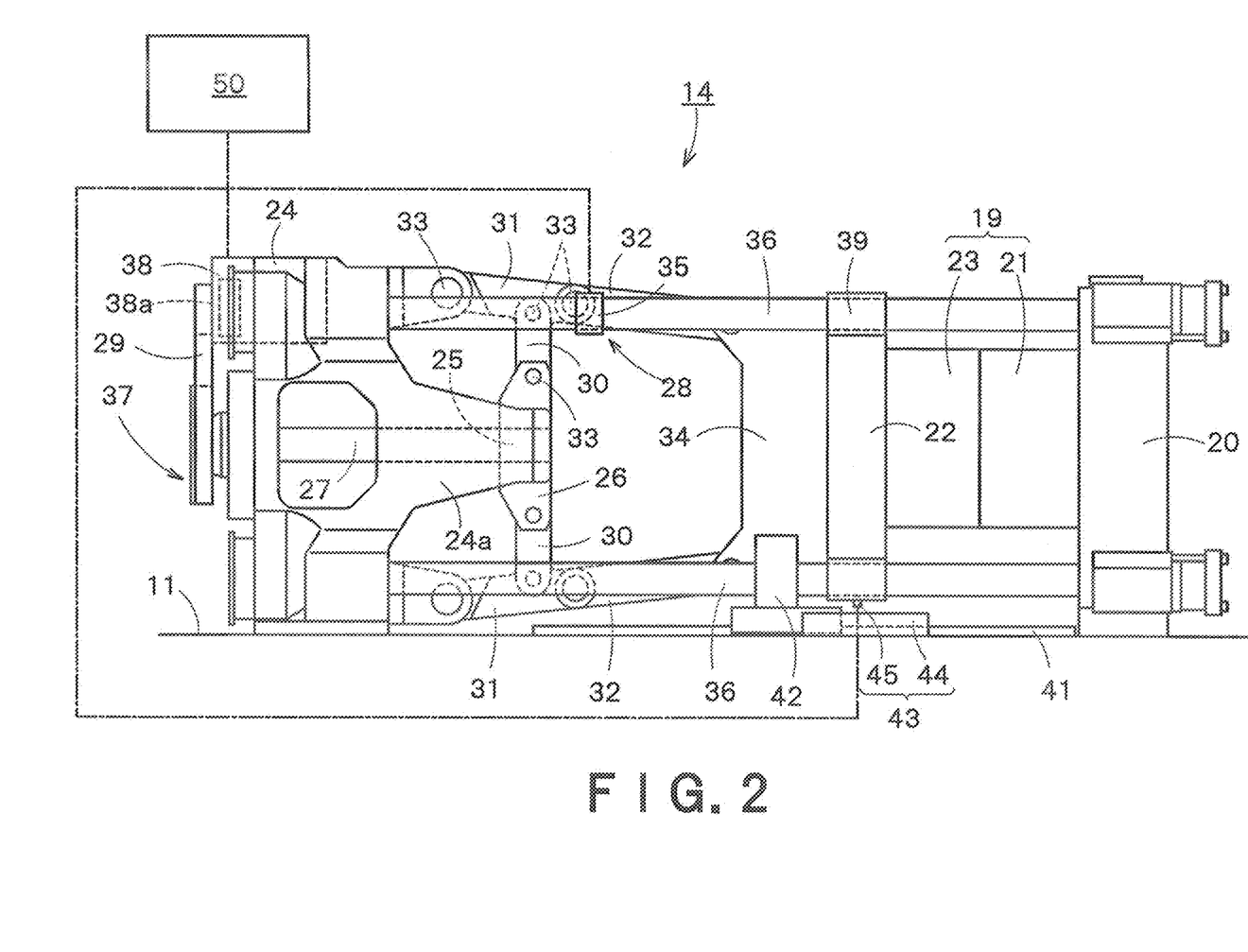
FIG. 2 is a side view of the toggle type clamping device of an injection molding machine according to an embodiment of the present invention.

In FIG. 2, reference numeral 26 indicates a crosshead. At the central portion of this crosshead 26, there is provided a nut portion 25 of a drive device 37 driving a toggle mechanism 28. The nut portion 25 is threadedly engaged with a ball screw 27. A guide (not shown) guiding the movement in the front-rear direction of the crosshead 26 is supported by an arm portion 24a of the rear plate 24. The ball screw 27 is driven by an electric motor 38 via a timing belt 29. As a result, the nut portion 25 and the crosshead 26 move linearly along the longitudinal direction of the ball screw 27.

The electric motor 38 is, for example, a servo motor, and is mounted on the rear plate 24. The electric motor 38 is provided with an encoder (first position detector) 38a detecting the position of the movable die plate 22 based on the position of the crosshead 26. That is, the encoder 38a detects the rotational position of the electric motor 38, whereby the position of the crosshead 26 is detected; based on the position of the crosshead 26, the movement amount (operation amount) and on the position of the movable die plate 22 are obtained through computation.

In the present embodiment, the drive device 37 is constructed, for example, from the nut portion 25, the crosshead 26, the bail screw 27, the timing belt 29, and the electric motor 38.

The rear plate 24 and the movable die plate 22 are connected to each other by the toggle mechanism 28. The toggle mechanism 28 has toggle links 30, 31, and 32 on each of the upper and lower sides. One end of each toggle link 30 is connected to the crosshead 26 via a link pin 33, and one end of each toggle link 31 is connected to the rear plate 24 via a link pin 33. One end of each toggle link 32 is connected to the movable die plate 23 via a toggle link connection portion 34. Further, the toggle links 30 and the toggle links 31 are connected together via the link pins 33, and the toggle links 31 and the toggle links 32 are connected together via the link pins 33.

Due to this toggle mechanism 28, constructed as described above, the movement of the movable die plate 22 for mold opening/closing is performed, and the clamping force is transmitted. That is, through the driving of the electric motor 8, it is possible to move the movable die plate 22 via the toggle mechanism 28 (movement is possible).

When performing mold closing and clamping by the toggle mechanism 28, the crosshead 26 advances due to the electric motor 38 to cause the toggle mechanism 28 to expand. That is, through the driving of the electric motor 38, the ball screw 27 is rotated in a predetermined direction via the timing belt 29, whereby the nut portion 25 and the crosshead 26 advance in the direction of the stationary die plate 20. At this time along with the upward opening of the upper toggle links 31 and 32, the lower toggle links 31 and 32 are opened downwardly, with the movement of the crosshead 26 being transmitted to the movable die plate 22 via the toggle mechanism 28 to effect the mold closing and clamping of the stationary die 21 and the movable die 23.

Conversely, when effecting the mold opening of the stationary die 21 and the movable die 23, the crosshead 26 is caused to retreat by the electric motor 38, and the toggle mechanism 28 is bent. That is, through the driving of the electric motor 38, the ball screw 27 is rotated in a direction opposite that at the time of mold dosing via the timing belt 29, whereby the nut portion 25 and the crosshead 26 retreat in the direction of the rear plate 24. By causing the nut portion 25 to retreat in the direction of the rear plate 24, the upper toggle links 31 and 32 are closed downwardly, and, at the same time, the lower toggle links 31 and 32 are closed upwardly, with the result that mold opening is effected on the stationary die 21 and the movable die 23.

In this way, in the present embodiment, in the state in which the mold closing and clamping have been completed, the toggle links 31 and 32 are substantially lines, and, at the time of mold opening the toggle links 31 and 32 are bent toward the axis of the ball screw 27, that is, bent so as to enfold inward.

To guide the movable die plate 22, the tie bars 36 are inserted into the four corner portions of the movable die plate 22 via bushes 39. Further, to guide the movable die plate 22, guide rails 41 are laid on both the right and left sides of the frame 11 so as to be parallel to the tie bars 36; the guide rails 41 are provided with slidable guides 42 mounted on both the right and left side surfaces of the movable die plate 22.

The tie bars 36 are provided with a tie bar sensor (pressure detector) 35. The tie bar sensor 35 serves to detect the actual clamping force of the stationary die 21 and the movable die 23. This tie bar sensor 35 may be, for example, a strain sensor; in this case, the actual clamping force is detected by measuring the strain (expansion) of the tie bars 36 when the clamping force is applied thereto.

On the other hand, the movable die plate 22 is provided with a linear scale (second position detector) 43 detecting the actual position of the movable die plate 22. The linear scale 43 serves to detect the actual position of the movable die plate 22 when the movable die plate 22 moves linearly with respect to the stationary die plate 20. The linear scale 43 has, for example, a scale 44 and a head 45 which derives positional information from the scale 44. In the present embodiment, the scale 44 is fixed onto the frame 11, and the head 45 is mounted on the movable die plate 22, whereby the actual position of the movable die plate 22 is detected. While in the present embodiment the scale 44 is fixed to the frame, and the head 45 is mounted on the movable die plate 22, the present invention is not restricted to this arrangement. For example, the head 45 may be fixed onto the frame, and the scale 44 may be mounted on the movable die plate 22.

At least the drive device 37, the tie bar sensor 35, and the linear scale 43 are respectively connected to an injection molding machine controller (control device, control portion) 50. The injection molding machine controller 50 may be constructed by including, for example, a computer having a CPU, ROM, RAM, external storage device, etc. This injection molding machine controller 50 controls the injection device 12, the toggle type clamping device 14, etc. based on various kinds of input information. In this case, the injection molding machine controller 50 controls the entire injection molding machine 10; in the present embodiment, however, it is only necessary for the controller to control at least the drive device 3.

The toggle type damping device 14 of the injection molding machine 10 according to the present embodiment is constructed as described above. Next, the operation and effect of the drive device 37 will be described in connection with foam molding. The toggle type clamping device 14 is a toggle link type clamping device in which there are effected the movement of the movable die plate 22 for mold dosing and mold opening by the toggle mechanism 28, and the clamping.

Figure 3:
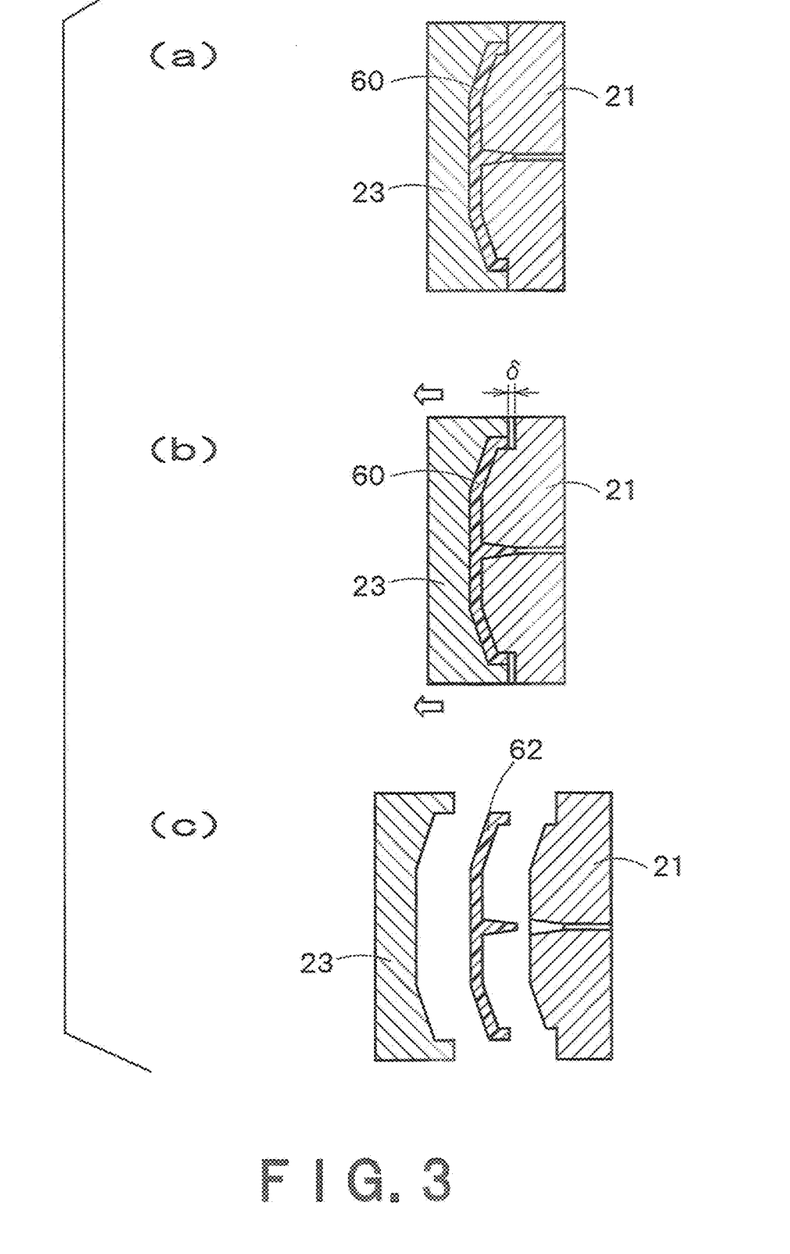
FIG. 3 is an explanatory view illustrating a foam molding step.

In this toggle type clamping device 14, in the case where foam molding as shown in FIG. 3 is executed, a cavity 60 formed by the stationary die 21 and the movable die 23 is first filled with a molten resin containing foaming agent and the surface layer of the molten resin is solidified to form skin layer (FIG. 3(*a*)).

After this, the movable die 23 is slightly opened by a predetermined movement amount 6 (the core-back operation is performed), whereby the resin is foamed (FIG. 3(*b*)) (minute mold opening step). After the foaming, the resin is cooled, and then the movable die 23 is caused to retreat to open the mold 19, and a molding 62 is extracted (FIG. 3(*c*)).

In the toggle type clamping device 14 according to the present embodiment, when performing the core-back operation (minute mold opening operation), the movable die plate 22 is moved in the mold opening direction, and, at the same time, the injection molding machine controller 50 detects the position of the crosshead 26 based on the detection value of the encoder 38*a*. The movement amount (operation amount) of the movable die plate 22 is computed based on the position of the crosshead 26. When the movement amount of the movable die plate 22 has attained a set movement amount (set mold opening amount, set minute opening amount, set operation amount) A previously set, the movement of the movable die plate 22 is stopped.

At this time, (A) there is the possibility of the stationary die 21, the movable die 23, etc. having undergone thermal expansion (thermal contraction) due to the fluctuation in their temperature. Further, (B) there is the possibility of the components such as the rear plate 24, the movable die plate 22, the link pins 33, and the toggle links 30, 31, and 32 having undergone thermal expansion (thermal contraction). Further, (C) there exists a machining error in the components such as the rear plate 24, the movable die plate 22, the link pins 33, and the toggle links 30, 31, and 32, so that there exists an individual difference between different toggle type clamping devices 14. Furthermore, (D) at the time of computation of the movement amount of the movable die plate 22 by the injection molding machine controller 50, a computation error is to be expected to be generated. Thus, there is a fear of an error being generated between the movement amount of the movable die plate 22 computed by the injection molding machine controller 50 and the actual movement amount of the movable die plate 22.

In this connection, according to the present embodiment, as described below, the injection molding machine controller 50 executes both a first correction and a second correction, whereby the error in the movement amount of the movable die plate 22 is corrected.

First, the first correction will be described. In the first correction, the movement amount of the movable die plate 22 is corrected at the time of the core-back operation based on the actual clamping force detected by the tie bar sensor 35, and the set clamping force which is previously set by the injection molding machine controller 50. A set clamping force P1 is the value of a desired clamping force input to the injection molding machine controller 50, and is the target value of the clamping force.

That is, the set damping force which is previously set by the injection molding machine controller 50 is indicated by symbol P1, the actual clamping force is indicated by symbol P2, and a set drive amount is indicated by symbol G. Here, the set drive amount G is the requisite drive amount for the clamping force to theoretically attain the set clamping force P1 at the time of clamping. The actual damping force P2 is the clamping force actually measured by the tie bar sensor 35 when the movable die plate 22 is moved by the set drive amount G. At this time, the amount obtained by multiplying the ratio of the increase (reduction) in the actual damping force P2 with respect to the set clamping force P1 by the set drive amount G is regarded as the correction amount σ1. That is, $\sigma1=|(P2-P1)/P1|\times G$.

At the time of the core-back operation, the injection molding machine controller 50 corrects the set movement amount A by this correction amount σ1. That is, when the actual clamping force P2 is larger than the set damping force P1, it is to be assumed that thermal expansion or the like has been generated, for example, in the stationary die 21 and the movable die 23. Thus, the correction amount σ1 is added to the set movement amount A to increase the movement amount of the movable die plate 22 (it is further moved to the mold opening side with respect to the set movement amount, or the set movement amount is increased). On the other hand, when the actual clamping force P2 is smaller than the set clamping force P1, it is to be assumed that thermal contraction or the like has been generated, for example, in the stationary die 21 and the movable die 23. Thus, the correction amount at is subtracted from the set movement amount A to reduce the movement amount of the movable die plate 22 (it is moved to the mold closing side with respect to the set movement amount, or the set movement amount is reduced).

Next, a second correction will be described. In the second correction, the movement amount (operation amount) of the movable die plate 22 is corrected at the time of the core-back operation based on the movement amount (operation amount) of the movable die plate 22 obtained from the encoder 38a and on the actual position of the movable die plate 22 obtained from the linear scale 43.

That is, before performing the core-back operation, the movement amount of the movable die plate 22 (the movement amount from the damping state) is previously obtained from the encoder 38a, and, at the same time, the movement amount by which the movable die plate 22 actually moves (the movement amount from the clamping state) at that time is obtained from the linear scale 43. Here, the movement amount of the movable die plate 22 obtained from the encoder 38a will be referred to as X1, and the actual movement amount of the movable die plate 22 obtained from the linear scale 43 will be referred to as X2. In this case, the amount by which the actual movement amount X2 has been increased (reduced) with respect to the movement amount X1 is regarded as the correction amount σ2. That is, σ2=|X1−X2|.

At the time of the core-back operation, the injection molding machine controller 50 corrects the set movement amount A by the correction amount σ2. That is, when the actual movement amount X2 of the movable die plate 22 is larger than the movement amount X1 obtained through computation, the correction amount σ2 is subtracted from the set movement amount A to reduce the movement amount of the movable die plate 22 (It is moved to the mold closing side with respect to the set movement amount, or the set movement amount is reduced). On the other hand, when the actual movement amount X2 of the movable die plate 22 is smaller than the movement amount X1 obtained through computation, the correction amount σ2 is added to the set movement amount A to increase the movement amount of the movable die plate 22 (it is further moved to the mold opening side with respect to the set movement amount, or the set movement amount is increased).

Then, the correction amount σ1 by the first correction and the correction amount σ2 by the second correction are added together, and added to the set movement amount (that is, computation is performed by using the set movement amount, the correction amount σ1 by the first correction, and the correction amount σ2 by the second correction), whereby the total movement amount of the movable die plate 22 in the core-back operation is determined.

The first correction and the second correction described above will be illustrated specifically.

When clamping is to be performed, suppose that the set clamping force P1 which is previously set is 100 t, and that the actual clamping force P2 measured by the tie bar sensor 35 at this time is 11.0 t. In this case, the actual clamping force P2 is larger than the set clamping force P1 by 10%. Further, suppose that the requisite set drive amount G of the movable die plate 22 for obtaining the set clamping force P1 of 100 t is 1 mm. At this time, the correction amount σ1 by the first correction is 10% of the set drive amount G (1 mm), i.e., 0.1 mm.

On the other hand, suppose that the actual movement amount X2 of the movable die plate 22 obtained from the linear scale 43 is 5.2 mm, and that the movement amount X1 of the movable die plate 22 obtained from the encoder 38a is 5 mm. In this case, the correction amount σ2 by the second correction is 0.2 mm, which is the difference between X1 and X2 (second correction).

Here, assuming that the set movement amount A at the time of the core-back operation is 5 mm, the correction amount σ1 is added to the set movement amount A, and the correction amount σ2 is subtracted therefrom. That is, correction is effected such that the movement amount of the movable die plate 22 during the core-back operation is A+ρ1−σ2=5+0.1−0.2=4.9 mm. At the time of the core-back operation, the injection molding machine controller 50 stops the movable die plate 22 at the position where the movement amount of the movable die plate 22 obtained through computation is 4.9 mm, whereby it is possible to set the actual movement amount of the movable die plate 22 to 5 mm. As a result, the movement amount of the movable die plate 22 at the time of the core-back operation is fixed, making it possible to make the minute foaming amount of the foam layer of the molding uniform. As a result, it is possible to achieve an improvement in terms of the quality of the molding.

As described above, according to the present embodiment, it is possible to correct the error in the movement amount of the movable die plate 22 generated due to (A) the thermal expansion (thermal contraction) of the stationary die 21 and the movable die 23, (B) the thermal expansion (thermal contraction) of the rear plate 24, the movable die plate 22, the link pins 33, the toggle finks 30, 31, and 32, etc., (C) the machining error existing in the rear plate 24, the movable die plate 22, the link pins 33, the toggle links 30, 31, and 32, etc., and (D) the computation error of the injection molding machine controller 50.

More specifically, according to the present embodiment, the movement amount of the movable die plate 22 at the time of the minute mold opening operation is corrected based on the actual clamping force detected by the tie bar sensor 35 and the set clamping force previously set by the injection molding machine controller 50 (first correction, first correction means, first correction portion). As a result, it is possible to correct the error in the movement amount of the movable die plate generated due to the above-mentioned causes (A) through (D).

Further, according to the present embodiment, the movement amount of the movable die plate 22 at the time of the minute mold opening operation is corrected based on the movement amount of the movable die plate 22 obtained from the encoder 38a and the actual position of the movable die plate 22 obtained from the linear scale 43 (second correction, second correction means, second correction portion). As a result, it is possible to correct the error in the movement amount of the movable die plate 22 generated due to the above-mentioned causes (B) through (D).

The first correction and the second correction may be executed for each shot. For example, at the time of each shot, along with the detection of the actual clamping force detected by the tie bar sensor 35, the actual position of the movable die plate 22 is detected by the linear scale 43. After that, based on the actual clamping force and the actual position of the movable die plate 22 thus detected, the movement amount of the movable die plate 22 may be corrected at the time of the next shot.

The correction amount by the second correction may be a value varying in accordance with the movement distance of the movable die plate 22 at the time of the core-back operation (at the time of the minute mold opening operation) (set movement amount A, set operation amount A).

That is, in the entire stroke range of the linear scale 43, the entire section the movable die plate 22 moves is first previously divided into a plurality of sections.

Next, with respect to each of the plurality of sections, the difference between the movement amount of the movable die plate 22 previously obtained from the encoder 38a and the actual position of the movable die plate 22 obtained, from the linear scale 43 is obtained as the correction amount σ2. For example, in the case where the entire section the movable die plate 22 moves is divided into n sections, the correction amount σ2 is obtained with respect to each of the n sections. The information on the plurality of sections and the information on the correction amount σ2 for each section are stored, for example, in the injection molding machine controller 50.

At the time of the core-back operation, the injection molding machine controller 50 may call up the correction amount σ2 corresponding to the movement distance the movable die plate 22 moves (set movement amount A), and correct the movement amount of the movable die plate 22 by using the correction amount σ2. For example, in the case where the set movement amount A is 5 mm, the correction amount σ2 corresponding to the section corresponding to the set movement amount 5 mm may be used, and, in the case where the set movement amount A is 10 mm, the correction amount σ2 corresponding to the section corresponding to the set movement amount 18 mm may be used.

Generally speaking, due to the presence of the toggle mechanism 28 between the movable die plate 22 and the crosshead 26, there are cases where the difference between the movement amount of the movable die plate 22 obtained from the encoder 38a and the actual position of the movable die plate 22 obtained from the linear scale 43 varies in accordance with the position of the movable die plate 22. Even in such cases, by causing the correction amount σ2 by the second correction to vary in accordance with the set movement amount A, it is possible to accurately set the correction amount σ2 by the second correction, making it possible to approximate the actual movement amount of the movable die plate 22 to the set movement amount A more accurately.

While in the present embodiment described above the molding apparatus is an injection molding machine, this should not be construed restrictively. The present invention is also applicable to other molding apparatuses such as a die casting machine. Further, in the present invention, the control portion may have a first correction portion and a second correction portion.

The invention claimed is:

1. A clamping device comprising:
a frame;
a pressure receiving platen positioned on the frame;
a stationary platen positioned on the frame and on which one die of a mold is mounted;
a movable platen positioned on the frame and arranged opposite the stationary platen and on which another die of the mold is mounted,
guides mounted on both side surfaces of the movable platen sliding on guide rails which are laid on both sides of the frame;
tie bars inserted into four corner portions of the movable platen via bushes to guide the movable platen;
a toggle mechanism including one end connected to the pressure receiving platen and another end connected to the movable platen via a toggle link connection portion, the toggle mechanism being configured to open and close the mold by causing the movable platen to advance and retreat;
a drive device including a crosshead, the drive device configured to drive the toggle mechanism;
a first position detector configured to detect an operation amount X1 of the movable platen based on a position of the crosshead;
a pressure detector configured to detect an actual clamping force P2 of the mold;
a second position detector, which is configured to detect an actual movement amount X2 of the movable platen, is a linear scale having a scale and a head, one of the scale and the head being fixed onto the frame, and the other being mounted on the movable platen; and
a control portion configured to control at least the drive device, the control portion including a circuit configured to:
correct the operation amount X1 of the movable platen during a minute mold opening operation based on the actual clamping force P2 detected by the pressure detector, on a set clamping force P1 previously set by the control portion, and on a set drive amount G which is a requisite drive amount for a clamping force to attain the set clamping force at a time of clamping, by:
calculating a first correction amount σ1 obtained by multiplying a ratio of a difference between the actual clamping force P2 and the set clamping force P1 by the set drive amount G,
correcting the operation amount X1 of the movable platen during the minute mold opening operation based on the operation amount X1 of the movable platen obtained by the first position detector and on the actual movement amount X2 of the movable platen obtained by the second position detector, by calculating a second correction amount σ2 by which the actual movement amount X2 has been increased or reduced with respect to the operation amount X1 of the movable platen,
calculating an actual movement amount of the movable platen, to account for machining errors of components of the clamping device, by a numerical expression, A±(|P2−P1|/P1)*G±|X1−X2|, based on a set movement amount A of the movable platen, the first correction amount σ1 and the second correction amount σ2,
storing information on a plurality of sections into which an entire range through which the movable platen is configured to move is divided, and
storing information on a plurality of predetermined second correction amounts Γ2 each respectively being previously obtained for respective ones of the plurality of sections,
wherein correcting the operation amount X1 of the movable platen, to account for machining errors of the components of the clamping device, during the minute mold opening operation comprises calling up the stored predetermined second correction amount σ2 corresponding to the set movement amount A and correcting the operation amount X1 of the movable platen by using the called up correction amount σ2.

2. The clamping device according to claim 1, wherein a correction amount obtained by the control portion is a value that varies according to a movement distance the movable platen moves at a time of the minute mold opening operation.

3. A molding apparatus comprising the clamping device claimed in claim 1.

4. A molding method by performing a minute mold opening operation using the clamping device of claim 1, such that the movable platen moves in a direction away from the stationary platen, the minute mold opening operation comprising:

correcting a first correction in which an operation amount of the movable platen by calculating the first correction amount σ1 based on the actual clamping force P2 detected by the pressure detector, on the set clamping force P1 previously set by the control portion, and on the set drive amount G which is the requisite drive amount for the clamping force to attain the set clamping force P1 at the time of clamping;

correcting a second correction in which the operation amount of the movable platen based on the operation amount X1 of the movable platen obtained by the first position detector and on the actual movement amount X2 of the movable platen obtained by the second position detector, by calculating the second correction amount σ2 by which the actual movement amount has been increased or reduced with respect to the operation amount of the movable platen;

calculating the actual movement amount of the movable platen, to account for machining errors of components of the clamping device, by the numerical expression $A\pm(|P2-P1|/P1)*G\pm|X1-X2|$, based on the set movement amount A of the movable platen, the first correction amount σ1, and the second correction amount σ2, wherein the second correction amount σ2 is set to a value in advance varying in accordance with the set movement amount A; and correcting the second correction further comprising calling up, from a memory storing information on a plurality of sections into which an entire range through which the movable platen is configured to move is divided and information on a plurality of predetermined second correction amounts σ2 each respectively being previously obtained for respective ones of the plurality of sections, the stored predetermined second correction amount σ2 corresponding to the set movement amount A and correcting the operation amount of the movable platen by using the called up correction amount σ2.

5. A clamping device comprising:
a frame;
a pressure receiving platen positioned on the frame;
a stationary platen positioned on the frame and on which one die of a mold is mounted;
a movable platen positioned on the frame and arranged opposite the stationary platen and on which another die of the mold is mounted, guides mounted on both side surfaces of the movable platen sliding on guide rails which are laid on both sides of the frame;
tie bars inserted into four corner portions of the movable platen via bushes to guide the movable platen;
a toggle mechanism including one end connected to the pressure receiving platen and another end connected to the movable platen via a toggle link connection portion, the toggle mechanism being configured to open and close the mold by causing the movable platen to advance and retreat;
a drive device including a crosshead, the drive device configured to drive the toggle mechanism;
a first position detector configured to detect an operation amount X1 of the movable platen based on a position of the crosshead;
a pressure detector configured to detect an actual clamping force P2 of the mold;
a second position detector, which is configured to detect an actual movement amount X2 of the movable platen, is a linear scale having a scale and a head, the scale being fixed onto the frame, and the head being mounted on the movable platen; and
a control portion configured to control at least the drive device, the control portion including a circuit configured to:
correct the operation amount X1 of the movable platen during a minute mold opening operation based on the actual clamping force detected by the pressure detector, on a set clamping force P1 previously set by the control portion, and on a set drive amount G which is a requisite drive amount for a clamping force to attain the set clamping force at a time of clamping, by:
calculating a first correction amount σ1 obtained by multiplying a ratio of a difference between the actual clamping force and the set clamping force P1 by the set drive amount G,
correcting the operation amount X1 of the movable platen during the minute mold opening operation based on the operation amount X1 of the movable platen obtained by the first position detector and on the actual movement amount X2 of the movable platen obtained by the second position detector, by calculating a second correction amount σ2 by which the actual movement amount X2 has been increased or reduced with respect to the operation amount X1 of the movable platen,
calculating an actual movement amount of the movable platen, to account for machining errors of components of the clamping device, by a numerical expression, $A\pm(|P2-P1|/P1)*G\pm|X1-X2|$, based on a set movement amount A of the movable platen, the first correction amount σ1 and the second correction amount σ2,
storing information on a plurality of sections into which an entire range through which the movable platen is configured to move is divided, and
storing information on a plurality of predetermined second correction amounts σ2 each respectively being previously obtained for respective ones of the plurality of sections,
wherein correcting the operation amount X1 of the movable platen, to account for machining errors of the components of the clamping device, during the minute mold opening operation comprises calling up the stored predetermined second correction amount σ2 corresponding to the set movement amount A and correcting the operation amount X1 of the movable platen by using the called up correction amount σ2.

* * * * *